Patented July 1, 1952

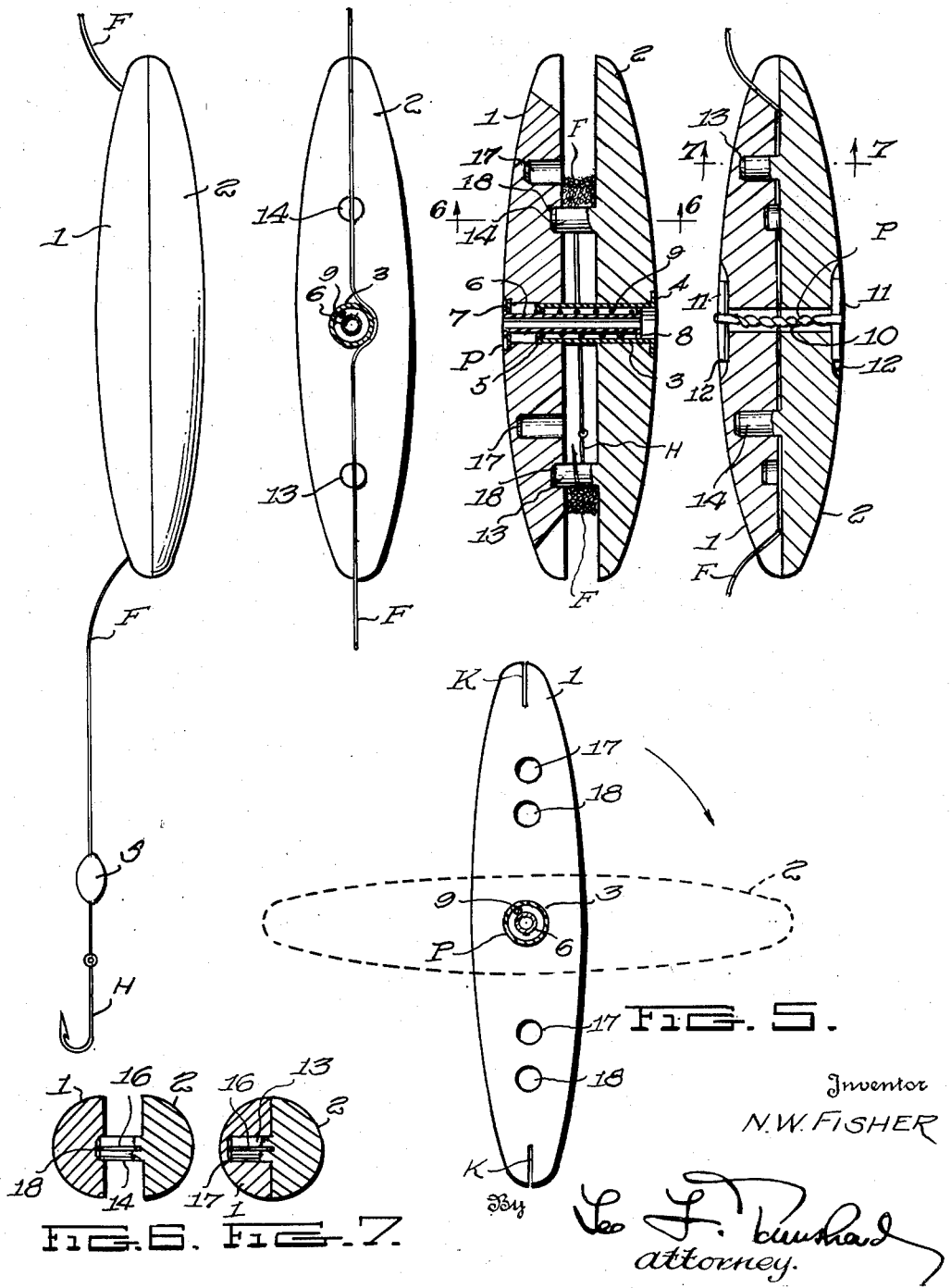

2,601,736

UNITED STATES PATENT OFFICE 2,601,736

FISHING FLOAT AND REEL

Norbourne W. Fisher, Marianna, Ark.

Application June 1, 1948, Serial No. 30,474

4 Claims. (Cl. 43—43.11)

This invention relates to a float or bob for a fishing line that is adapted by a simple manipulation to be converted into a reel for storing the fishing line when not in use.

In certain types of still fishing a float is positioned on the fishing line the required distance above the sinker and hook but this has heretofore been a separate article. The primary object of this invention is to form the float of two sections normally biased for face contact to clamp and secure a length of fishing line therebetween when acting as a float but separable in interconnected spaced relationship to act as a hand reel upon which the entire length of the fishing line may be wound with the hook concealed for storage in the pocket or tackle box.

A further object of the invention is to provide a convertible float and reel formed of two pivoted sections expansible and reversible which in one position have a face to face clamping contact and in reverse position are spaced but interconnected.

These and other objects of the present invention will appear as the following description thereof proceeds, and in order to more clearly understand the invention, references may be had to the accompanying drawings in which an embodiment of the invention is shown.

In the drawings:

Figure 1 is a side elevation of the float positioned on a fishing line.

Figure 2 is an inner face view of one section with the expansible pivot in section.

Figure 3 is a longitudinal section showing the device expanded to form a reel.

Figure 4 is a similar view with a different form of expansible pivot showing the device in clamping position to form a float.

Figure 5 is an inner face view of one section of the device with the other section shown in dotted lines being reversed.

Figure 6 is a section on the line 6—6 of Figure 3, and

Figure 7 is a section on the line 7—7 of Figure 4.

This device is primarily a float and is formed of wood, plastic or other material of proper buoyancy. The float may be of any desired configuration but is preferably oval or lozenge shaped as shown in Figure 1. It is formed of two sections 1 and 2 having opposed flat faces through which a fishing line F is positioned lengthwise as clearly shown in Figures 1 and 2. The fishing line carries the usual sinker S and hook H at one end, the other end being connected with a pole, reel or used as a hand line.

The sections 1 and 2 are biased toward face contact by an expansible medially located pivot P. In the form shown in Figures 2, 3 and 5, alined holes are drilled through the two sections at the center thereof. In the section 2 is mounted a metallic tubular member 3 flared at its outer end 4, said flare being countersunk in the surface of the section 2. The other end of the tube 3 extends into the section 1 and is inwardly flared at 5. A smaller tube 6 is mounted in the section 1 by a countersunk washer 7 and is slidably mounted in the tube 3 through the flared end 5. The inner end of the tube 6 is outwardly turned to form a stop 8 for a coil spring 9 positioned between the tubes between said stop and the flared end 5 of the tube 3. The expansible pivot thus formed normally biases the sections 1 and 2 to face to face contact but permits the sections to be expanded and rotated for a purpose to be hereinafter described.

A simpler form of expansible pivot P is shown in Figure 4 wherein a twisted rubber band 10 is inserted through the alined holes in sections 1 and 2 and the ends are looped over holders 11 mounted in lengthwise countersinks or recesses 12 in outer surfaces of the sections. The twisted rubber band 10 through the connection shown and described will bias the sections 1 and 2 toward face to face contact yet permit expansion of the sections for rotation.

To permit an interlocked or interconnected face engagement or similar spacing of the sections 1 and 2 the faces of the sections are provided with cooperating studs and sockets. In the form shown the face of the section 2 is provided with a pair of studs 13 and 14 on either side of the pivot P and unequally spaced therefrom. These studs have end slots 16 shown in Figures 6 and 7 for a purpose to be hereinafter described. The opposed face of the section 1 is provided on each side of the pivot P with pairs of sockets 17 and 18, the sockets 17 being deeper than the sockets 18. The sockets 17, 17 and 18, 18 are also unequally spaced from the pivot P at the same ratio that the studs 13 and 14 are spaced therefrom.

When the sections 1 and 2 are in line clamping position as shown in Figures 1 and 4 the studs 13 and 14 are positioned in the deep sockets 17 and the bias of the pivot P permits the face to face contact. When it is desired to space the sections 1 and 2 to the position shown in Figure 3, the sections are pulled apart until the studs clear the sockets and rotated 180° on the pivot. Upon release the bias of the pivot will cause the studs 13 and 14 to enter the shallower sockets 18 with the result the sections are spaced. The cooperating studs and sockets interlock the sections 1 and 2 in either position.

Assuming the device is to be used as a float. The sections are expanded and the studs 13 and 14 alined with the deep sockets 17. At a suitable place a length of the fishing line F is strung lengthwise therebetween with the line positioned in the slots 16 in the studs and through end kerfs K in the section 1. The sections are released and the studs entering the deep sockets 17 permit a face to face line clamping contact due to the bias of the pivot P. This securely clamps the float on the fishing line at any desired place and permits a quick adjustment along the length of the line where desired.

When it is desired to convert the device from a float to a reel the sections 1 and 2 are expanded against the tension of the pivot P until the studs 13 and 14 clear the sockets 17. The line is cleared and one section or the other pivoted or rotated 180°. This brings the studs 13 and 14 in alinement with the shallow sockets 18 and upon release the parts assume the position shown in Figure 3. The device then assumes the form of a reel. The hook H may be looped over one stud and the line wound on the studs 13 and 14 as clearly shown in Figure 3. Thus the line may easily and conveniently be stored for transportation with no possibility of tangling.

The multiple use of the device described obviously enhances the utility of the article as an improved adjunct for the type of fishing with which it is used. The adaptability of the structure shown and described readily lends itself to various other uses in temporary adjustments of the line on the device in moving from place to place without entirely removing the fishing line therefrom. Primarily, though, the chief advantage is the quick convertibility of the device from a float to a reel or vice versa.

Although the improved fishing float and reel has been illustrated and described herein to a detailed extent, it will be understood, of course, that the invention is not to be regarded as limited correspondingly in scope, but includes all variations coming within the terms of the appended claims.

I claim:

1. A device of the character described comprising two sections of buoyant material having flat opposed faces, an expansible pivot for said sections upon which one section may be rotated relative to the other section, and spaced studs on the flat face of one section, the face of the other section having sockets of different depths adapted to receive said studs in accordance with the pivoted position of the sections with respect to each other.

2. A device of the character described comprising two sections of buoyant material having flat opposed faces, an expansible pivot for said sections upon which one section may be rotated relative to the other section, and spaced studs on the flat face of one section, the face of the other section having multiple sockets of different depths adapted to alternatively receive the studs for either spacing the sections or permitting face to face clamping contact.

3. A device of the character described comprising two sections of buoyant material having flat opposed faces, pivotal expansible means for the sections upon which one section may be rotated relative to the other section and normally biasing the sections to face to face contact, and releasable interlocking means for the sections comprising projections on one section and recesses on the other section, the projections and the recesses being eccentrically arranged relative to the pivotal expansionable means and adapted to hold them in face to face contact or substantially spaced in reversed positions.

4. A device of the character described comprising two sections of buoyant material having flat opposed faces, pivotal expansible means for the sections upon which one section may be rotated relative to the other section and normally biasing the sections to face to face contact, cooperative interconnecting means on the opposed faces of the sections adapted to hold them in face contact in one position and spaced relationship in a reverse position, said means being releasable upon expansion of the pivot to permit reverse rotation, and said interconnecting means comprising projections on one section and recesses on the other section, the projections and recesses being eccentrically arranged relative to the pivotal expansionable means.

NORBOURNE W. FISHER.

REFERENCES CITED

The following references are of record in the file of this patent:

UNITED STATES PATENTS

| Number | Name | Date |
|---|---|---|
| 418,995 | Tufts | Jan. 7, 1890 |
| 541,789 | Kunzelman | June 25, 1895 |
| 820,736 | Rhodes | May 15, 1906 |
| 842,540 | Fleming | Jan. 29, 1907 |
| 1,080,013 | Landin | Dec. 2, 1913 |
| 1,176,631 | Wells | Mar. 21, 1916 |
| 1,259,664 | Peters | Mar. 19, 1918 |
| 2,395,892 | Lontz | Mar. 5, 1946 |
| 2,465,631 | Bruestle | Mar. 29, 1949 |